E. SCHAEFER.
MOTOR VEHICLE.
APPLICATION FILED JUNE 24, 1913.

1,159,107.

Patented Nov. 2, 1915.

Witnesses:
Earl G. Klock.
J. Ellis Glen

Inventor:
Edward Schäfer,
by
His Attorney.

UNITED STATES PATENT OFFICE.

EDWARD SCHAEFER, OF NIEDERSCHÖNEWEIDE, GERMANY, ASSIGNOR TO GENERAL ELECTRIC COMPANY, A CORPORATION OF NEW YORK.

MOTOR-VEHICLE.

1,159,107. Specification of Letters Patent. Patented Nov. 2, 1915.

Application filed June 24, 1913. Serial No. 775,472.

*To all whom it may concern:*

Be it known that I, EDWARD SCHAEFER, subject of the King of Prussia, residing at Niederschöneweide, Germany, have invented certain new and useful Improvements in Motor-Vehicles, of which the following is a specification.

My invention relates to motor vehicles and particularly to the connection of the running gear of such vehicles to the frame thereof.

It is usual in such vehicles to employ radius rods which connect the axles with the body or frame of the vehicle to transmit the movement of the running gear to the body. Such radius rods have been flexibly connected to the body, heretofore, in order that the axles may move in accordance with the play of the vehicle springs. Such flexible connections, however, only relieve the running gear from torsional strains and the vehicle body from strains due to the vertical motion of the axles when the wheels run over rough places in the road.

My invention has for its object a novel construction of such radius rods, which not only take care of such strains as pointed out above, but also all lateral or thrust strains such as those due to the starting or stopping of the vehicle, and thus acts as a combined thrust and torque rod.

To this end, my invention consists in various features of novelty which will be pointed out with particularity in the claims annexed to and forming a part of this specification.

For a better understanding of my invention reference may be had to the following description taken in connection with the accompanying drawing, in which:—

Figure 1:
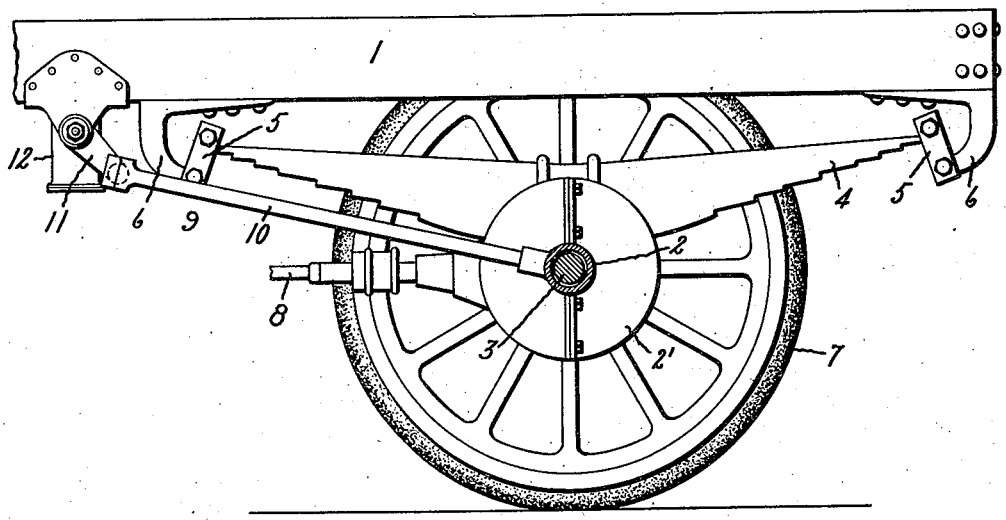
Figure 2:
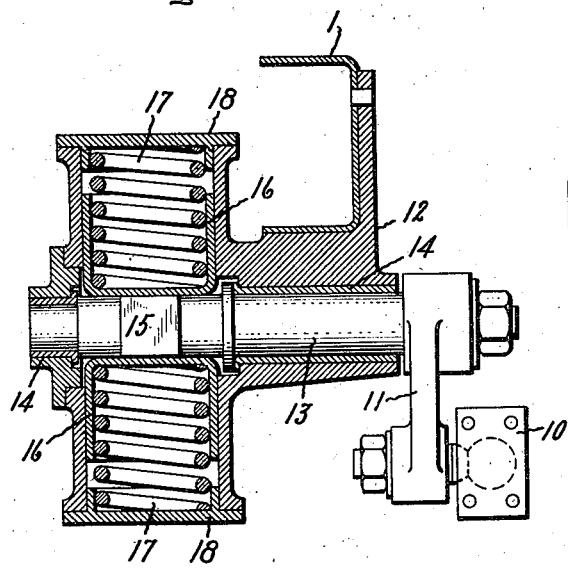
Figure 3:
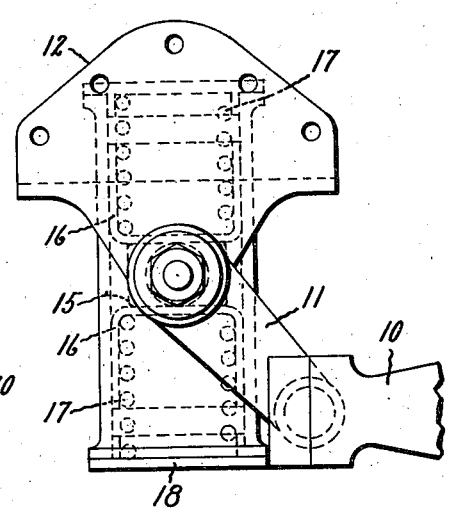

Figure 1 is a side elevation of a portion of a vehicle in which my invention is embodied; Fig. 2 is an enlarged view of a portion of my radius rod, and Fig. 3 is a side view.

Referring to the drawing, 1 is a side member of the frame of a vehicle, and is shown as a channel iron. The rear axle of the vehicle in this case comprises two members 2 and 3, one of these members is stationary and the other rotates. The body or frame of the vehicle is supported upon this axle through springs 4 which at their ends are secured to links 5 pivoted on brackets 6 secured to the side members of the frame. The middle of the springs 4 is secured to the stationary part 2 of the axle. Wheels 7 are mounted upon the ends of the rotating part 3 of the axle. The rotating part of the axle is driven from a suitable motor (not shown) through a propeller shaft 8 and a differential, the differential being contained in the enlarged portion 2' of the part 2 of the axle. These parts may be of any well known or usual form.

My radius rod 9 connects the frame of the vehicle with the part 2 of the axle and comprises a thrust rod 10 and a crank 11 pivotally connected at one end to the thrust rod and flexibly supported at the other end on the frame. I have shown the crank 11 provided with a spherical stud which is engaged by the thrust rod 10. In order to flexibly support one end of the crank on the frame, I preferably employ a casing 12 fastened to the side member 1 and in which is rotatably mounted a shaft 13. The free end of this shaft which extends out of the casing carries the crank arm 11. The shaft 13 is journaled in bearings 14 and has a rectangular portion 15 which is enlarged. Piston-like spring plates 16 are pressed against two opposite sides of the rectangular portion of the shaft 13 by means of springs 17, which also engage the covers 18 of the casing. If the shaft 13 rotates in either direction, the springs 17 are compressed by the rectangular portion of the shaft engaging the spring plates cornerwise, and thus the rotation of this shaft is elastically opposed.

I have shown the crank 11 at an angle of approximately 45° to the direction of the thrust forces arising in the thrust rod 10 due to the starting, stopping or other sudden changes in the speed of the vehicle. By arranging the crank at this angle, it can be rotated in both directions by these thrust forces as well as by the strains due to the tendency of the stationary part of the axle to turn in its support. My radius rod also relieves the propeller shaft 8 from all strains.

Since only the component of the forces in the thrust rod 10 which are perpendicular to the crank 11 produce any rotation of the crank, and since this component is dependent upon the angle which the crank arm makes with the direction of the original force, it is possible by suitably selecting the angle of inclination of the crank, to establish any desired relation of the resisting forces of the springs 17 to the thrust forces and the turning force on the thrust rod 10.

Although I have described my invention in connection with a vehicle having a rear axle composed of two parts, one stationary and the other rotating, it may be employed in connection with one having a fixed axle, as is common in electric motor driven vehicles, or other forms of axle constructions, and I aim in the appended claims to cover such modifications as well as any modifications which do not depart from the spirit and scope of my invention.

What I claim as new and desire to secure by Letters Patent of the United States, is:—

1. In a motor vehicle, a frame, wheels and a wheel axle, and a radius rod for connecting the axle to the frame, said radius rod comprising a thrust rod connected at one end to the axle, and a crank flexibly supported on the frame so that it may oscillate around its point of support, said crank being arranged at an angle other than 180° to the thrust rod and pivotally connected thereto.

2. In a motor vehicle, a frame, wheels and a wheel axle, and a radius rod comprising a thrust rod having one end connected to said axle, a crank pivotally connected at one end to said rod and extending at an angle other than 180 degrees thereto, and means for flexibly supporting the other end of said crank on said frame.

3. In a motor vehicle, a frame, wheels and a wheel axle, and a radius rod comprising a thrust rod having one end connected to said axle, a crank pivotally connected at one end to said thrust rod, means for pivotally supporting the other end of said crank on the frame, and means resisting the turning of said crank.

4. A radius rod for a motor vehicle comprising a crank arm pivotally supported at one end on the vehicle frame, a thrust rod connecting the other end of the arm with the axle, said crank arm and thrust rod extending at an angle other than 180 degrees to each other, and flexible means resisting the turning of said crank on its pivotal support.

5. In a motor vehicle, a frame, wheels and a wheel axle, and a radius rod comprising a thrust rod having one end connected to said axle, a crank pivotally connected at one end to said rod, and means for flexibly supporting the other end of said crank on said frame comprising a shaft having a rectangular portion and a spring member coöperating with said rectangular portion of said shaft.

6. In a motor vehicle, a frame, wheels and a wheel axle, and a radius rod comprising a thrust rod having one end connected to said axle, a crank pivotally connected at one end to said rod, and means for flexibly supporting the other end of said crank on said frame comprising a shaft having a rectangular portion, bearings for said shaft, and a spring member coöperating with said rectangular portion of said shaft.

7. In a motor vehicle, a frame, wheels and a wheel axle, and a radius rod comprising a thrust rod having one end connected to said axle, a crank pivotally connected at one end to said rod, and means for flexibly supporting the other end of said crank on said frame comprising a shaft having a rectangular portion and spring members pressing against two opposite sides of said rectangular portion of said shaft.

8. In a motor vehicle, a frame, wheels and a wheel axle, and a radius rod comprising a thrust rod having one end connected to said axle, a crank pivotally connected at one end to said rod, and means for flexibly supporting the other end of said crank on said frame comprising a shaft having a rectangular portion, bearings for said shaft, and spring members pressing against two opposite sides of said rectangular portion of said shaft.

In witness whereof, I have hereunto set my hand this 26" day of May, 1913.

EDWARD SCHAEFER.

Witnesses:
 ALB. KRÜGER,
 C. STEINBERG.